United States Patent
Fairfield et al.

(10) Patent No.: US 10,671,084 B1
(45) Date of Patent: Jun. 2, 2020

(54) USING OBSTACLE CLEARANCE TO MEASURE PRECISE LATERAL GAP

(71) Applicant: Waymo LLC, Mountian View, CA (US)

(72) Inventors: Nathaniel Fairfield, Mountain View, CA (US); Ian James Mahon, Berkeley, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/196,258

(22) Filed: Jan. 28, 2019

Related U.S. Application Data

(63) Continuation of application No. 15/879,960, filed on Jan. 25, 2018, now Pat. No. 10,162,363, which is a
(Continued)

(51) Int. Cl.
*G01C 22/00* (2006.01)
*G06K 9/00* (2006.01)
(Continued)

(52) U.S. Cl.
CPC ........... *G05D 1/0253* (2013.01); *G05D 1/021* (2013.01); *G05D 1/0212* (2013.01);
(Continued)

(58) Field of Classification Search
USPC ........ 382/100, 103–107, 122–123, 155, 162, 382/168, 173, 181, 199, 209, 219, 232, 382/254, 274, 276, 286–291, 305, 312, 382/154, 172; 701/28, 38, 23; 702/97; 180/167; 348/135
See application file for complete search history.

(56) References Cited

U.S. PATENT DOCUMENTS 8,207,836 B2 * 6/2012 Nugent ................. B60Q 9/006
180/167
8,487,993 B2 * 7/2013 Cunningham ............ G06T 7/62
348/135
(Continued)

FOREIGN PATENT DOCUMENTS

WO 2013074034 A1 5/2013

OTHER PUBLICATIONS

Levinson, J. et al. (May 6, 2011). Towards Fully Autonomous Driving: Systems and Algorithms. Intelligent Vehicles Symposium (IV), 2011 IEEE. Date of Conference: Jun. 5-9, 2011, pp. 163-168.

*Primary Examiner* — Seyed H Azarian
(74) *Attorney, Agent, or Firm* — Botos Churhill IP Law

(57) ABSTRACT

A system and method is provided for identifying an object along a road, where the object may be represented by a bounding box, and projecting a set of obstacle points within the bounding box corresponding to the identified object. In one aspect, a two-dimensional plane oriented perpendicular to a direction of the movement of the vehicle may be identified. In another aspect, the areas of the plane that may be occupied based on the set of obstacle points may be determined to generate a contour of the identified object. Thereafter, the height profiles of the identified object and the vehicle may be determined and identified, respectively. Based on the height profiles, a minimum clearance may be determined.

20 Claims, 7 Drawing Sheets

| x (width in meters) | y (height measurement in meters) | (x,y) |
|---|---|---|
| 1.4 | 0.2 | (1.4, 0.2) |
| 1.4 | 0.4 | (1.4, 0.4) |
| 1.4 | 0.6 | (1.4, 0.6) |
| 1.4 | 0.8 | (1.4, 0.8) |
| 1.4 | 1.0 | (1.4, 1.0) |
| 1.4 | 1.2 | (1.4, 1.2) |
| 1.4 | 1.4 | (1.4, 1.4) |
| 1.4 | 1.6 | (1.4, 1.6) |
| 1.4 | 1.8 | (1.4, 1.8) |
| 1.4 | 2.0 | (1.4, 2.0) |
| 0.6 | 2.2 | (0.6, 2.2) |
| 0.5 | 2.4 | (0.5, 2.4) |
| 0.4 | 2.6 | (0.4, 2.6) |
| 0.3 | 2.8 | (0.3, 2.8) |
| 0.4 | 3.0 | (0.4, 3.0) |

Related U.S. Application Data continuation of application No. 15/598,427, filed on May 18, 2017, now Pat. No. 9,958,869, which is a continuation of application No. 14/452,860, filed on Aug. 6, 2014, now Pat. No. 9,767,366.

(51) Int. Cl.
    *G05D 1/02*       (2020.01)
    *G06K 9/62*       (2006.01)
    *G08G 1/16*       (2006.01)

(52) U.S. Cl.
    CPC ....... *G05D 1/0238* (2013.01); *G06K 9/00791* (2013.01); *G06K 9/00805* (2013.01); *G06K 9/6204* (2013.01); *G05D 2201/0212* (2013.01); *G08G 1/165* (2013.01)

(56) References Cited

U.S. PATENT DOCUMENTS

| | | | |
|---|---|---|---|
| 2006/0129292 A1* | 6/2006 | Ohkubo | B60W 50/14 701/38 |
| 2010/0235129 A1* | 9/2010 | Sharma | G01S 7/4972 702/97 |
| 2013/0253754 A1* | 9/2013 | Ferguson | B60W 30/18154 701/28 |

* cited by examiner

US 10,671,084 B1

USING OBSTACLE CLEARANCE TO MEASURE PRECISE LATERAL GAP

CROSS-REFERENCE TO RELATED APPLICATIONS

The present application is a continuation of U.S. patent application Ser. No. 15/879,960, filed on Jan. 25, 2018, which is a continuation of U.S. patent application Ser. No. 15/598,427, filed on May 18, 2017, which is a continuation of U.S. patent application Ser. No. 14/452,860, filed on Aug. 6, 2014, now issued as U.S. Pat. No. 9,767,366, the disclosures of which are incorporated herein by reference.

BACKGROUND

Autonomous vehicles, such as vehicles which do not require a human driver, may be used to aid in the transport of passengers or items from one location to another. An important component of an autonomous vehicle is the perception system, which allows the vehicle to perceive and interpret its surroundings using cameras, radar, sensors, and other similar devices. The perception system executes numerous decisions while the autonomous vehicle is in motion, such as speeding up, slowing down, stopping, turning, etc. Autonomous vehicles may also use the cameras, sensors, and global positioning devices to gather and interpret images and sensor data about its surrounding environment, e.g., parked cars, trees, buildings, etc. These images and sensor data allow the vehicle to safely maneuver itself around various objects.

For example, the perception system may interpret an object as a bounding box. A bounding box may be a virtual, three-dimensional box that entirely encloses the object. In this regard, the perception system may spatially identify where the object is relative to the vehicle and avoid hitting the bounding box. However, maneuvering around or under complex objects, such as a tree branch overhanging a road, may be difficult using a bounding box.

BRIEF SUMMARY

In one aspect, a method comprises identifying, using one or more computing devices, an object along a road, wherein the object is represented by a bounding box, and projecting, using the one or more computing devices, a set of obstacle points within the bounding box corresponding to the identified object. Moreover, the method comprises identifying, using the one or more computing devices, a two-dimensional plane oriented perpendicular to a direction of movement of the vehicle, and determining, using the one or more computing devices, which areas of the two-dimensional plane are occupied based on the set of obstacle points to generate a contour of the identified object. The method further comprises determining, using the one or more computing devices, a height profile of the identified object, identifying, using the one or more computing devices, a height profile of the vehicle, and determining, using the one or more computing devices, a minimum clearance based on the height profile of the identified object and the height profile of the vehicle.

In another aspect, a system is provided comprising a memory and one or more computing devices, each of the one or more computing devices having one or more processors, the one or more computing devices being coupled to the memory. The one or more computing devices are configured to identify an object along a road, wherein the object is represented by a bounding box, and project a set of obstacle points within the bounding box corresponding to the identified object. Moreover, the one or more computing devices are configured to identify a two-dimensional plane oriented perpendicular to a direction of movement of the vehicle, and determine which areas of the two-dimensional plane are occupied based on the set of obstacle points to generate a contour of the identified object. The one or more computing devices are further configured to determine a height profile of the identified object, identify a height profile of the vehicle, and determine a minimum clearance based on the height profile of the identified object and the height profile of the vehicle.

In yet another aspect, a non-transitory, tangible computer-readable medium on which instructions are stored, the instructions, when executed by one or more computing devices perform a method, the method comprises identifying an object along a road, wherein the object is represented by a bounding box, and projecting a set of obstacle points within the bounding box corresponding to the identified object. Moreover, the method comprises identifying a two-dimensional plane oriented perpendicular to a direction of movement of the vehicle, and determining which areas of the two-dimensional plane are occupied based on the set of obstacle points to generate a contour of the identified object. The method further comprises determining a height profile of the identified object, identifying a height profile of the vehicle, and determining a minimum clearance based on the height profile of the identified object and the height profile of the vehicle.

DETAILED DESCRIPTION

Figure 1A:
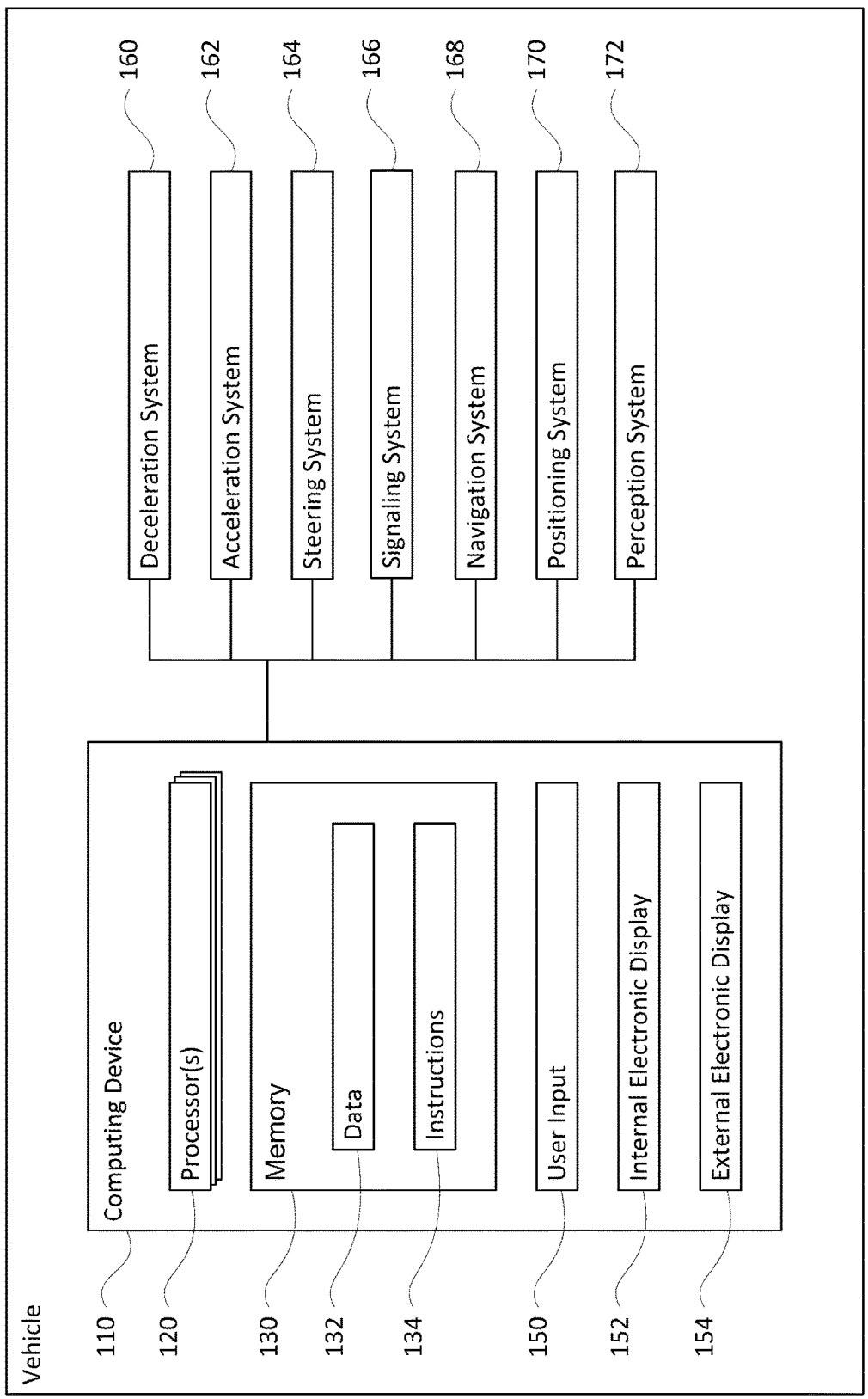
FIG. 1A is a functional diagram of a system in accordance with aspects of the disclosure.

The present disclosure relates to allowing a vehicle to maneuver around or underneath other objects in an autonomous driving mode. For example, a perception system of an autonomous vehicle may compute a minimum horizontal clearance measurement to determine whether the vehicle can maneuver around or under a complex object. In one scenario, the complex object may be a tree with a large overhanging branch. As such, the perception system may calculate lateral distances between the center of the autonomous vehicle and the tree at a plurality of height measurements to generate a two-dimensional height profile of the tree. Then, the difference between the tree's height profile and the vehicle's height profile may be computed to determine a minimum clearance measurement. This information may be used to determine whether the vehicle can safely maneuver under and/or around the tree.

In order to determine how the vehicle will fit next to or under various objects, a virtual model of the vehicle and its respective height profile may be generated. For example, a height profile of the vehicle may be based on the virtual model. The height profile may be generated by computing a lateral distance from the center to one or both sides of the vehicle (e.g., right side-view mirror, left side-view mirror) at various height measurements ascending from bottom to top of the vehicle, or vice versa. For instance, the vehicle's height profile may include an array of (x, y) values, where "x" is the vehicle width and "y" is the height.

The perception system of an autonomous vehicle may compute minimum clearance measurements between objects and the vehicle at intervaled steps along a road. For example, the intervaled steps may be every 0.25 meters or more or less. At each step, the perception system may identify a set of nearby objects and discard the objects that are far away from trajectory based on a threshold distance. For example, the perception system may perform analysis on objects that are within 15 meters of the vehicle's trajectory and temporarily disregard objects that are outside the threshold distance of 15 meters.

Thus, the perception system may first detect objects in the vehicle's environment. For example, the perception system may detect a tree overhanging a road as a series of coordinate points and arrange those points into a three-dimensional bounding box. The tree's bounding box may also contain a plurality of obstacles, such as overhanging branches, leaves, etc. In that regard, if the top of the tree protrudes out into the road, so may the bounding box.

If the tree is within the threshold distance, the perception system may project the coordinate points of the bounding box into a two-dimensional grid oriented perpendicular to the vehicle's direction of movement. For each intervaled step along the road, the two-dimensional grid may be a different cross-section or "slice" of the bounding box of a tree. In this regard, the perception system may perform analysis on one slice of the bounding box of a tree at a time. The grid may also contain a plurality of cells. Subsequently, the perception system may determine a two-dimensional contour of the complex object for the selected slice based on which cells of the grid are occupied by the projected points.

This contour may be used to determine a height profile for the tree. For example, a lateral distance may be measured from the center of the vehicle to an edge of the contour at a height measurement of 0.2 meters from the ground. Then, another lateral distance may be measured at a height measurement of 0.4 meters, and so on, until a set of lateral distances are measured. At minimum, the set may include the lateral distances that cover the height of the vehicle.

In that regard, the perception system may compare the contour of an object and the virtual model of the vehicle to compute a minimum clearance measurement for the object and the vehicle. By computing the difference between the object's height profile and the car's height profile, a minimum clearance measurement may be determined. This minimum clearance measurement may then be used to determine how the vehicle will drive around or under the object.

In addition, a threshold minimum horizontal distance may be used to prevent the vehicle from getting too close to the object. As an example, the threshold may be set at 0.13 meters. Thus, when the computed minimum clearance measurement is less than 0.13 meters, the perception system may determine that the vehicle will be too close to the object.

The above-described aspects allow autonomous vehicles and associated systems to compute more refined lateral clearance values of three-dimensional complex objects having asymmetrical structures. In that regard, an autonomous vehicle may determine when it would be safe to drive around or under a complex object, such as a tree, such that no point on the vehicle is horizontally too close to the tree.

As shown in FIG. 1A, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor(s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 132 may be retrieved, stored or modified by processor(s) 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

For example, data 132 may include a height profile of the vehicle 100. The height profile may be based on a virtual model of the vehicle 100. The virtual model represents a general three-dimensional shape, dimension, and/or geometry of the vehicle 100. As will be further discussed below, the one or more processors 120 of computing device 110 may compute a set of lateral clearance measurements from the vehicle to a particular object based at least in part on the height profile of the vehicle.

In another example, data 132 may also include at least one or more predetermined threshold clearance values to ensure that a vehicle does not get too close to an object. In other words, the predetermined threshold clearance may be a safety buffer between the vehicle and the object. In that regard, the threshold clearance may be an extra safety feature for an autonomous vehicle.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an ASIC or other hardware-based processor, such as a field programmable gate array (FPGA). Although FIG. 1A functionally illustrates the processor(s), memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above, as well as a user input 150 (e.g., a mouse, keyboard, touch screen and/or microphone) and various electronic displays (e.g., a monitor having a screen, a small LCD touch-screen or any other electrical device that is operable to display information). In this example, the vehicle includes an internal electronic display 152 as well as an external electronic display 154. In this regard, internal electronic display 152 may be located within a cabin of vehicle 100 and may be used by computing device 110 to provide information to passengers within the vehicle 100. External electronic display 154 may be located eternally or mounted on an external surface of the vehicle 100 and may be used by computing device 110 to provide information to potential passengers or other persons outside of vehicle 100.

In one example, computing device 110 may be an autonomous driving computing system incorporated into vehicle 100. The autonomous driving computing system may capable of communicating with various components of the vehicle. For example, returning to FIG. 1, computing device 110 may be in communication various systems of vehicle 100, such as deceleration system 160, acceleration system 162, steering system 164, signaling system 166, navigation system 168, positioning system 170, and perception system 172, such that one or more systems working together may control the movement, speed, direction, etc. of vehicle 100 in accordance with the instructions 134 stored in memory 130. Although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting and performing analysis on objects external to the vehicle such as other vehicles, obstacles in the roadway, traffic signals, signs, trees, etc. For example, the perception system 172 may include lasers, sonar, radar, one or more cameras, or any other detection devices which record data which may be processed by computing device 110. In the case where the vehicle is a small passenger vehicle such as a car, the car may include a laser mounted on the roof or other convenient location.

The computing device 110 may control the direction and speed of the vehicle by controlling various components. By way of example, if the vehicle is operating completely autonomously, computing device 110 may navigate the vehicle to a location using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine or by applying brakes by deceleration system 160), change direction (e.g., by turning the front or rear wheels of vehicle 100 by steering system 164), and signal such changes (e.g. by lighting turn signals of signaling system 166).

Figure 1B:
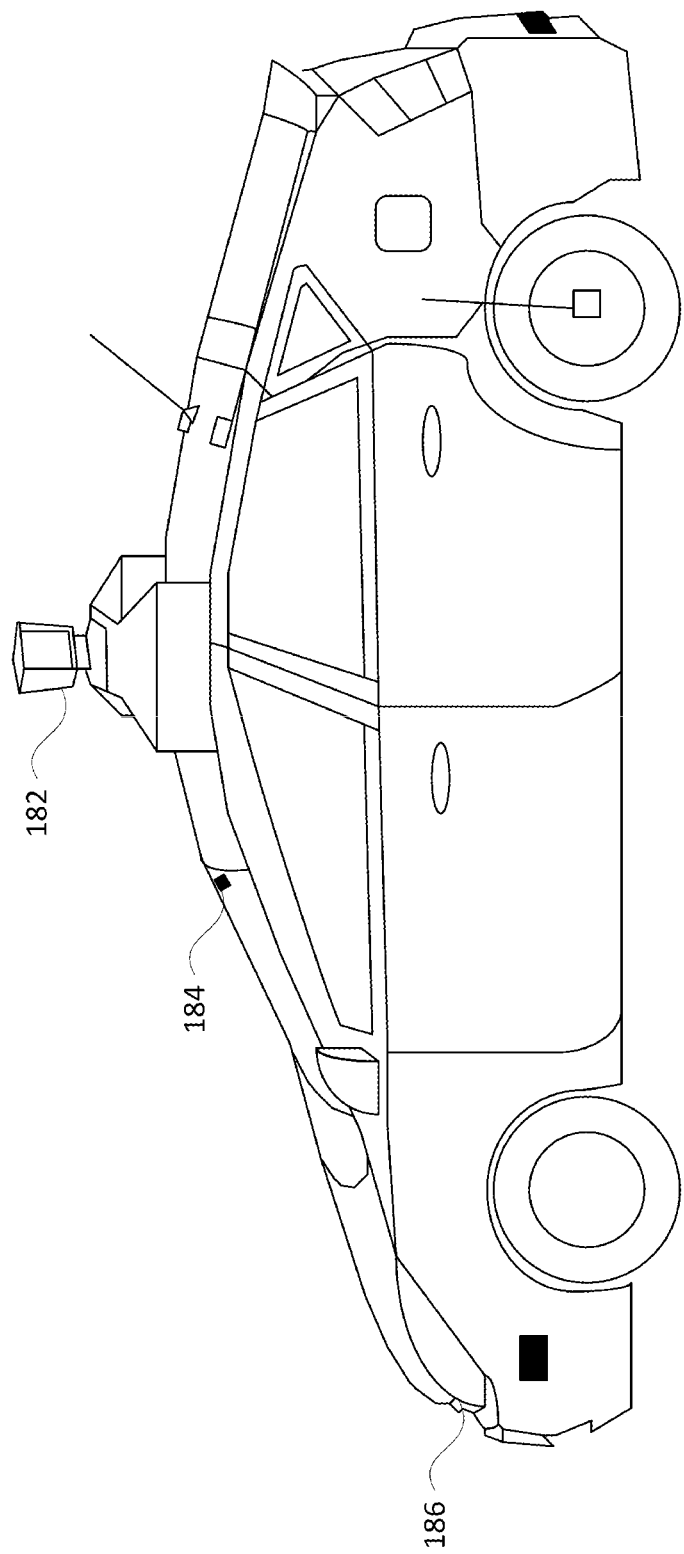
FIG. 1B is an example illustration of the vehicle of FIG. 1A in accordance with aspects of the disclosure.

FIG. 1B is an example illustration of vehicle 100 described above. As shown, various components of the perception system 172 may be positioned on the roof of vehicle 100 in order to better detect external objects while the vehicle is engaged. In this regard, one or more sensors, such as laser range finder 182 may be positioned or mounted to the roof of vehicle 101. Thus, the computing device 110 (not shown) may control laser range finder 182, e.g., by rotating it 180 degrees, or one or more cameras 184 mounted internally on the windshield of vehicle 100 to receive and analyze various images about the environment. Although the laser range finder 182 is positioned on top of perception system 172 in FIG. 1B, and the one or more cameras 184 mounted internally on the windshield, other detection devices, such as sonar, radar, GPS, etc., may also be positioned in a similar manner.

Figure 2:
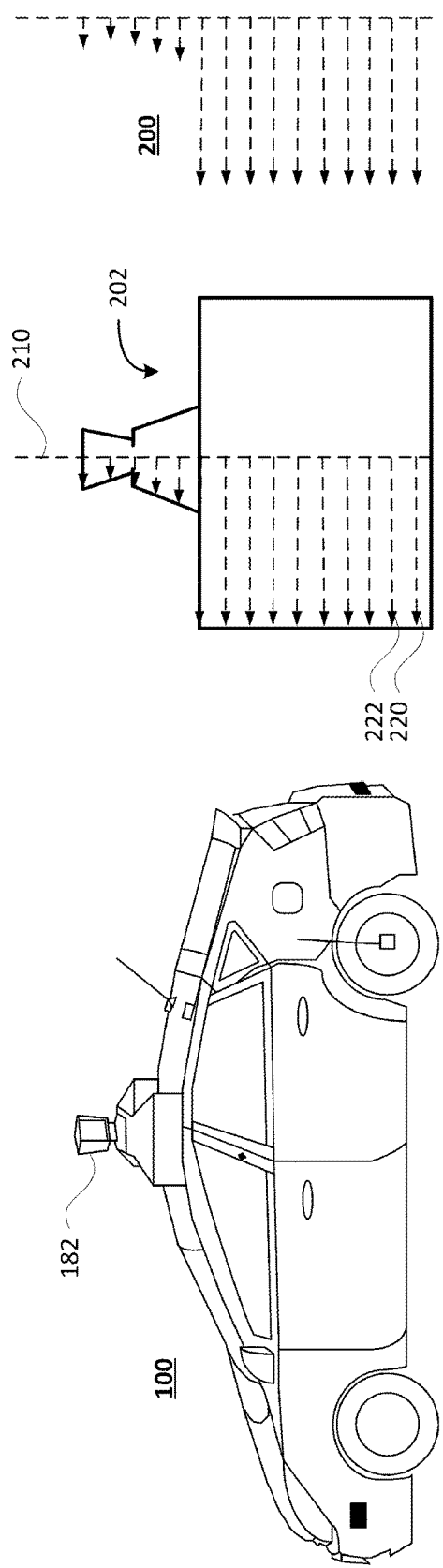
FIG. 2 is an example data describing a height profile of a vehicle in accordance with aspects of the disclosure.

As noted above, a height profile of a vehicle, e.g., vehicle 100, may be stored in memory 130 of computing device 110. FIG. 2 depicts an example height profile 200 of vehicle 100. As shown, height profile 200 may be based on a virtual model 202 of the vehicle 100. The virtual model represents a general three-dimensional shape, dimension, and/or geometry of the vehicle 100. When determining whether vehicle 100 can maneuver under or around a particular object, the perception system 172 may use and depend on the width and height measurements of the vehicle. As shown, a height profile may be generated based on the back view of the virtual model 202 by measuring lateral distances from a center line 210 (perpendicular to the lateral distances) to either side of the vehicle 100 at various height measurements ascending from bottom to top of the vehicle, or vice versa. Thus, the center line 210 may establish symmetry between the two sides of the vehicle 100.

As noted above, a set of lateral distances from the center of the vehicle may be measured at various height measurements. As shown in FIG. 2, lateral distance 220 is measured from the center line 210 to the left side of the virtual model 202 at a first height measurement. Similarly, lateral distance 222 is measured from the center line 510 to the left side of the virtual model 202 at a second height measurement. Additional lateral distances may be measured in a similar manner at third, fourth, fifth, etc. height measurements up to the top of vehicle 100. In one aspect, the height measurements may be intervaled, such that the vertical spacing between one lateral distance to another is equivalent.

A height profile may be represented by an array of width-height measurements that may correspond to the lateral distances. For example, the height profile 200 of virtual model 202 may include an array of (x, y) values, where "x" represents the lateral distances from the center line 210 in meters and "y" represents the height measurements in meters. As shown in chart 240, the rows associated with the first column 242 of chart 240 correspond to the lateral distances of the virtual model 202 from the center line 210 to the left side of vehicle 100. The rows associated with the second column 244 of chart 240 correspond to intervaled height measurements. The rows associated with the third column 246 of chart 240 correspond to the array of (x, y) values of the first and second columns.

For instance, the first 10 lateral distances for vehicle 100 at height measurements 0.2, 0.4, 0.6, 0.8, 1.0, 1.2, 1.4, 1.6, 1.8 and 2.0 meters correspond to 1.4 meters. At height measurements 2.2, 2.4, 2.6, 2.8 and 3.0 meters, the associated lateral distances for vehicle 100 correspond to 0.6 meters, 0.5, 0.4, 0.3, and 0.4 meters, respectively. As the height measurements are incremented, the lateral distances change in value as they conform to the dimensions of the virtual model 502 of vehicle 100.

While the height profile 200 depicted in FIG. 2 is measured from the left side of the virtual model 202 of vehicle 100, the height profile may also be measured from the right side of vehicle 100. Further, while chart 240 includes 3 columns and 15 rows organizing the lateral distance and height measurement values, the chart may be organized in other ways and include different types of measurements. In addition, the data associated with the height profile does not need to be represented as a chart, but may be represented or organized in various ways.

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 3:
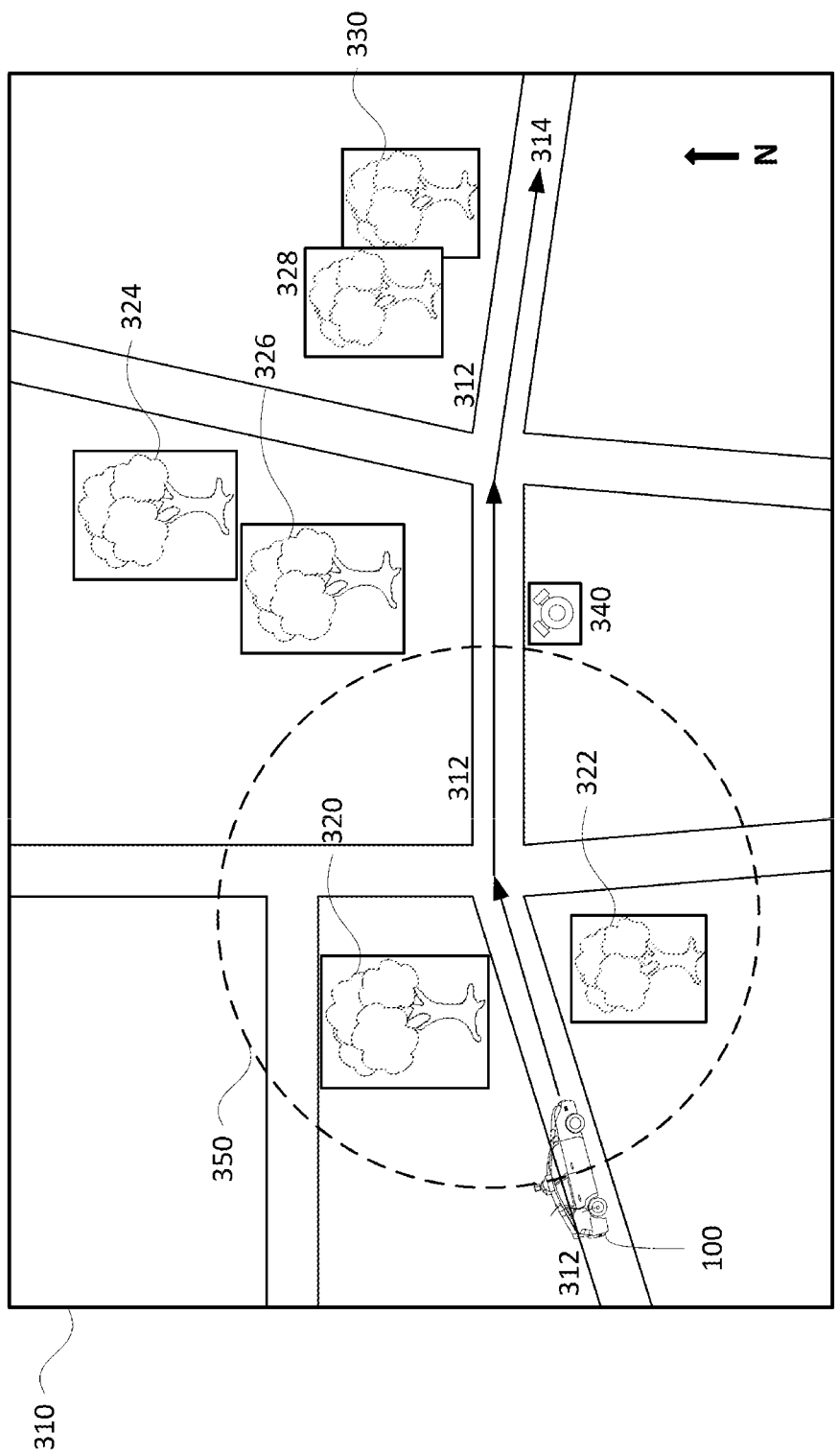
FIG. 3 is an example illustration of object detection in accordance with aspects of the disclosure.

A vehicle may detect various objects on and/or near the vehicle's trajectory and perform clearance measurements, as detailed below. FIG. 3 is an example illustration 300 of an autonomous vehicle detecting various objects along a particular trajectory. In this example, autonomous vehicle 100 may be traveling along road 312 in a geographic area 310, such as a suburban neighborhood. As shown, the vehicle 100 is traveling eastbound along trajectory 314 on road 312.

As the vehicle 100 travels along its trajectory, the vehicle's perception system 172 may detect and identify various objects near road 312 to maneuver around them, if necessary. For instance, the perception system 172 may detect trees 320, 322, 324, 326, 328, and 330. In addition, the perception system 172 may also detect fire hydrant 340 as well as other objects, such as parked vehicles (not shown) along road 412, traffic signs, trash bins, recycling bins, pedestrians, etc.

A perception system 172 of an autonomous vehicle may determine a bounding box for each detected object. A bounding box may be a virtual, three-dimensional box that may completely enclose detected 3D points corresponding to an object and also includes a set of measurements (e.g., length, width, height) unique to the bounding box associated with the object. For instance, the perception system 172 of vehicle 100 identifies objects, such as trees 320, 322, 324, 326, 328, 330 and fire hydrant 340, and arranges them into bounding boxes using at least a set of obstacle points based on the laser data derived from the laser rangefinder 182. The set of obstacle points may be used to determine the bounding box. As an example, tree 320 may be larger than fire hydrant 340, thus the dimensions of bounding box corresponding to tree 320 maybe comparatively greater than the dimensions of bounding box corresponding to fire hydrant 340.

In addition, perception system 172 of an autonomous vehicle may use these bounding boxes to determine where certain objects are spatially located relative to the location of the vehicle. By way of example only, referring to FIG. 3, the perception system 172 of vehicle 100 may identify that trees 320 and 322 are across the road 312 from each other. Further, the perception system 172 may identify that trees 324 and 326 are adjacent to one another, with fire hydrant 340 across the road 312. Finally, the perception system 172 may identify that trees 328 and 330 are adjacent to another. In this regard, the perception system 172 may communicate and relay information to the computing device 110 of vehicle 100, so that computing device 110 may safely maneuver vehicle 100 within the geographic area 310.

In one aspect, perception system 172 may identify a set of nearby objects along the vehicle's trajectory. In this regard, the perception system may temporarily disregard objects that are far away. By way of example only, the perception system 172 of vehicle 100 may establish a threshold distance 350 from the vehicle 100 to determine which objects to include in the set of nearby objects. As shown, a boundary of the threshold distance 350 may be a radial distance from vehicle 100. Alternatively, the threshold distance may be defined as a rectangle or follow the contour of the road, etc.

Using threshold distance 350, the perception system may determine that trees 320 and 322 lie within the boundary of threshold distance 350, and thus include trees 320 and 322 in the set of nearby objects. And since trees 324, 326, 328, and 330 as well as fire hydrant 340 lie outside the boundary of threshold distance 350, they may be temporarily disregarded by the perception system for the purposes of analysis of clearance measurement.

In some instances, an object may not entirely occupy the space of the bounding box. By way of example only, a bounding box containing a tree with a long overhanging branch may not accurately represent the actual shape of the tree. For instance, if the long branch of aforementioned tree overhangs the vehicle's trajectory, the associated bounding box may protrude into the trajectory. Thus, the computing device of the vehicle may generate a more accurate representation of the tree by three-dimensionally projecting a set of corresponding obstacle points. Thereafter, a cross-section or "slice" of the bounding box closest to the vehicle and perpendicular to the direction of the vehicle's movement may be used to generate a two-dimensional contour of the object based on a subset of obstacle points. Based on this contour, the vehicle may determine whether it should maneuver under or around the tree.

Figure 4C:
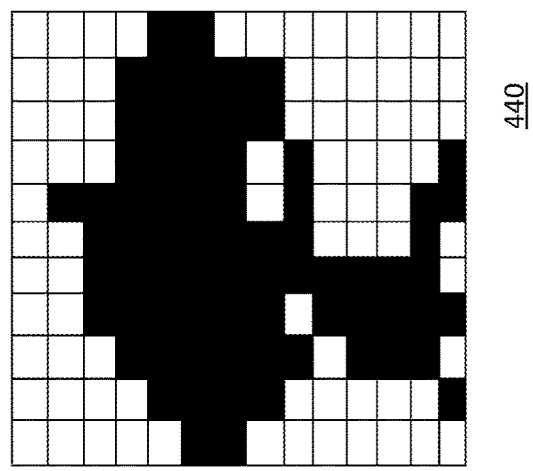
FIG. 4C is an example two-dimensional contour in accordance with aspects of the disclosure.
Figure 4B:
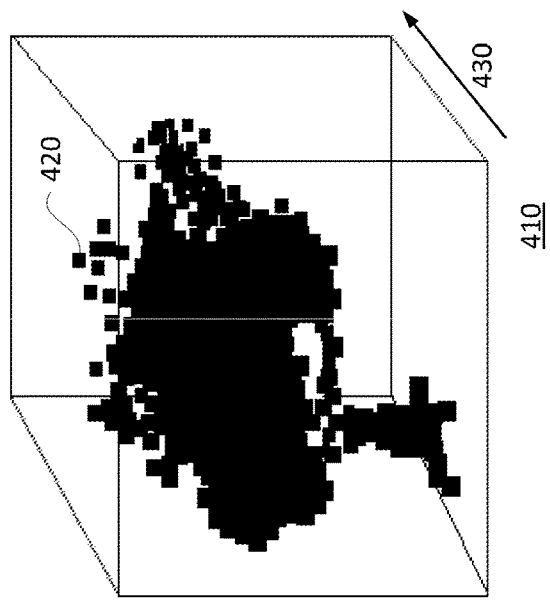
FIG. 4B is an example set of obstacle points in accordance with aspects of the disclosure.
Figure 4A:
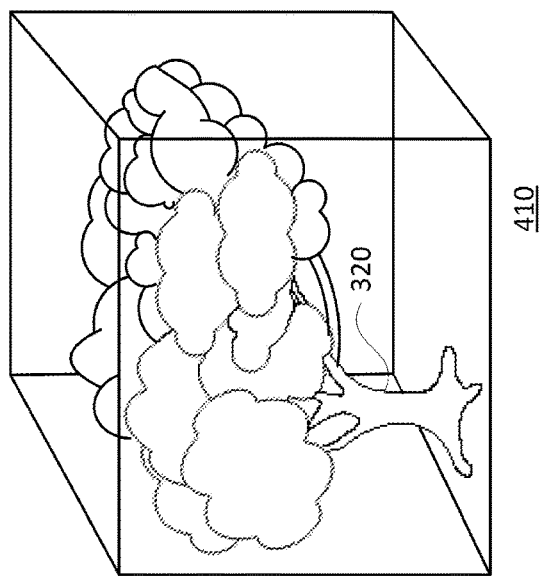
FIG. 4A is an example bounding box of an object in accordance with aspects of the disclosure.

FIG. 4A illustrates a bounding box 410 enclosing tree 320. As shown, the bounding box 410 generally exhibits the width, length, and height dimensions corresponding to the dimensions of the tree 320. In addition, the bounding box corresponding to the tree 320 may include a large amount of empty space at least below the tree's overhanging branch. For example, the perception system 172 of vehicle 100 may determine that bounding box 410 protrudes out into road 312 since bounding box 410 entirely encloses tree 320 (including the overhanging branch). In that regard, the computing device 110 of vehicle 100 may determine that tree 320 is impeding vehicle 100's trajectory 314 and determine how close the vehicle can maneuver relative to the tree 320.

In one example, a perception system may project a set of obstacle points corresponding to an object in order to determine a contour of the object. FIG. 4B illustrates a set of obstacle points 420 corresponding to tree 320. For example, the perception system 172 of vehicle may identify the set of obstacle points 420 within bounding box 410. As shown, the obstacle points 420 correspond to the shape of tree 320. Each obstacle point may be associated with a coordinate within the bounding box 610, such as (x, y, z), where x, y, and z represent the width (e.g., x-axis), the length (e.g., y-axis), and the height (e.g., z-axis) of bounding box 610, respectively. The coordinates may indicate the spatial position of the obstacle points.

Using the set of obstacle points, the perception system may take a cross-section or a slice of the bounding box 410 perpendicular to the vehicle's direction of movement 430 and use a subset of corresponding obstacle points to generate a two-dimensional contour of the tree 320. By way of example, as the vehicle 100 travels along each intervaled step of its trajectory under tree 320, the perception system 172 may identify a plane closest to the vehicle and perpendicular to the vehicle's direction of movement 430. The plane may be a cross-section of bounding box 410 and may also have a particular thickness. Moreover, the plane may contain a subset of the set of obstacle points determined in FIG. 4B.

The plane may also be configured into a grid that includes a plurality of grid cells. Based on which of these grid cells are occupied using the spatial position information of the subset of obstacle points, a two-dimensional contour may be generated. As shown in FIG. 4C, a two-dimensional contour 440 of tree 320 is outlined by the shaded grid cells. The computing device 110 of vehicle 100 may then use this contour to determine a height profile for the tree 320. Each grid cell may have a particular dimension, such as 20 cm, or more or less. The size of the gird cells (or the resolution of the grid) may be associated with the calculation speeds and measurement accuracy. For example, smaller grid cells may increase accuracy, but in some instances, may also decrease calculation speed. In another example, larger grid cells may increase calculation speeds, but may decrease accuracy.

Figure 5:
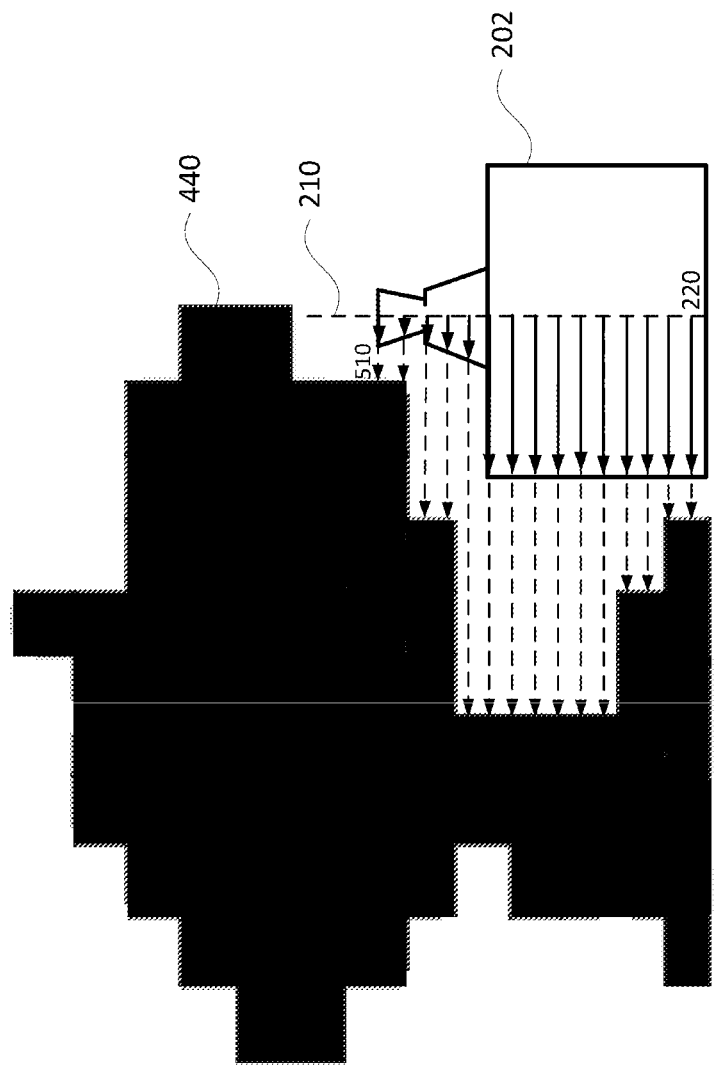
FIG. 5 is an example computation of minimum clearance measurement in accordance with aspects of the disclosure.

Based on the two-dimensional contour, the one or more computing devices may compute a set of clearance measurements and determine a minimum clearance measurement. FIG. 5 illustrates an example computation 500 of a minimum clearance measurement. In one example, the computing device 110 of vehicle 100 may initially determine the height profile of the tree in order to compute a minimum clearance. Similar to the height profile of virtual model 202 of vehicle 100 depicted in FIG. 2, the height profile of tree 320 may be based on a set of lateral distances from the center line 210 of the virtual model 202 to an edge or first non-empty grid cell shown of the two-dimensional contour 440 (shown in FIG. 4C) at various height measurements. As shown, the vertical height measurements may correspond to the height measurements associated with the height profile 200 of virtual model 202 (as seen in chart 240 of FIG. 2).

Once the computing device 110 determines the height profile of the tree, the computing device 110 may then compute a set of lateral clearance measurements by taking the difference between the height profile of virtual model 202 and the height profile of tree 320. The set of lateral clearance measurements may be based on the difference between the lateral distances of the tree 320 and the lateral distances of the virtual model 202. For example, the lateral distance 220 of height profile 200 may be subtracted from the lateral distance between center line 210 and an edge of the two-dimensional contour 440. As depicted, these differences are represented by the dashed arrows, e.g., difference value 510.

Once a set of lateral clearance measurements are computed, the computing device 110 may determine that the smallest of these values is the minimum clearance measurement for the vehicle 100 and the object. For instance, the computing device 110 may determine that difference value 510 is the smallest difference value and identify it as the minimum clearance measurement for the vehicle 100 at that intervaled step.

A minimum clearance measurement may be compared to the above-described predetermined threshold clearance value to ensure that a vehicle does not get too close to an object. For example, if computing device 110 determines that the minimum clearance measurement, based on the difference value 510, is less than the predetermined threshold clearance value, then the computing device 110 may determine that vehicle 100 can or cannot pass through the bounding box 410 corresponding to tree 320 without hitting the overhanging branch or any part of the tree. When the computing device 110 determines that the vehicle 100 cannot pass through the bounding box 410, the computing device may maneuver the vehicle around the bounding box 410.

Figure 6:
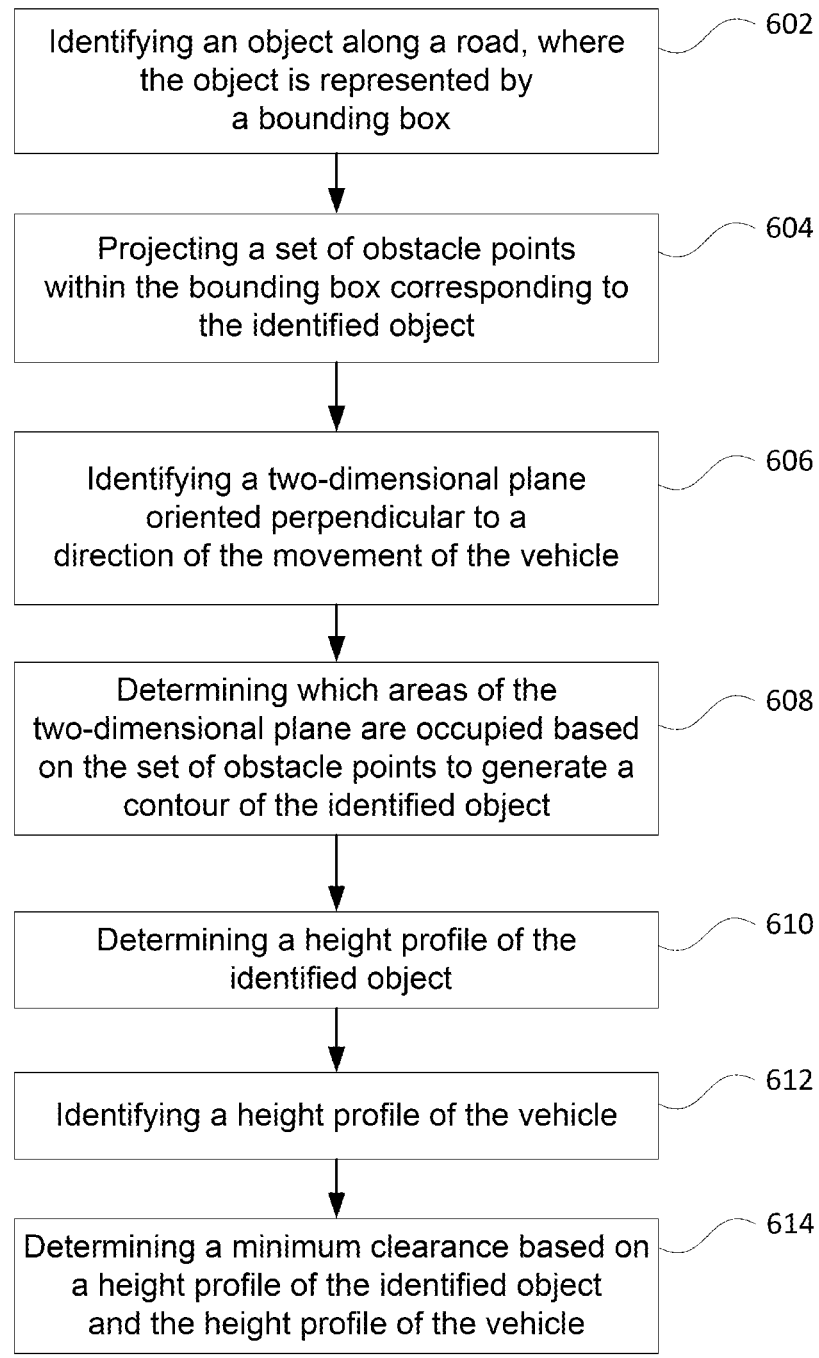
FIG. 6 is an example flow diagram in accordance with aspects of the disclosure.

FIG. 6 is a flow diagram 600 in accordance with aspects of the disclosure. By way of the example depicted in FIG. 1 only, at block 602, computing device 110 of vehicle 100 may identify an object along a road. As discussed above, the object may be represented by a bounding box. At block 604, the computing device 110 may project a set of obstacle points within the bounding box corresponding to the identified object. The set of obstacle points may be projected using laser data from at least the laser rangefinder 182 of vehicle 100. As noted above, the set of obstacle points may be used to ultimately determine whether the vehicle 100 can safely maneuver relative to the object.

At block 606, the computing device 110 identifies a two-dimensional plane oriented perpendicular to a direction of the movement of the vehicle. At block 608, the computing device 110 may determine which areas of the two-dimensional plane are occupied based on the set of obstacle points to generate a contour of the identified object. As discussed above, this contour may be based at least in part on a grid. The grid may have a plurality of grid cells and the contour may be based on which of the grid cells are occupied by an obstacle point. Using this contour, the computing device 110 may determine a height profile of the identified object, at block 610. Subsequently, at block 612, the computing device 110 may identify a height profile of the vehicle 100.

At block 614, the computing device 110 may determine a minimum clearance based on a height profile of the identified object and the height profile of the vehicle. As described above, one example of computing the minimum clearance is by taking the differences of the lateral distances of the two height profiles. The lowest clearance measurement from a set of clearance measurements may be the minimum clearance. This minimum clearance measurement may be compared to a predetermined threshold clearance to determine whether the vehicle 100 can safely maneuver relative to the identified object.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method maneuvering a vehicle in an autonomous driving mode alongside of an object, the method comprising:
   receiving, by one or more computing devices having one or more processors, sensor data including three-dimensional points on one or more surfaces of the object in an environment of the vehicle;
   determining, by the one or more computing devices, a two-dimensional contour of the object using the three-dimensional points;
   determining, by the one or more computing devices, a plurality of horizontal clearance distances between the vehicle and the two-dimensional contour of the object; and
   identifying, by the one or more computing devices, a smallest horizontal clearance distance of the plurality of horizontal clearance distances;
   maneuvering, by the one or more computing devices, the vehicle both under at least a portion of the object and alongside at least a portion of the object based on at least a comparison of the smallest horizontal clearance distance and a threshold minimum horizontal distance.

2. The method of claim 1, wherein the two-dimensional contour of the object corresponds to a curvature of the object in a plane perpendicular to a direction of movement of the vehicle.

3. The method of claim 1, wherein determining the two-dimensional contour includes projecting the three-dimensional points onto a grid.

4. The method of claim 3, wherein the grid corresponds to a plane perpendicular to a direction of movement of the vehicle.

5. The method of claim 3, wherein determining the two-dimensional contour includes identifying occupied cells of the grid, where an occupied cell corresponds to a cell of the grid in which at least one of the three-dimensional points is projected.

6. The method of claim 5, wherein determining the two-dimensional contour includes using the identified occupied cells to form the two-dimensional contour.

7. The method of claim 1, wherein determining the plurality of horizontal clearance distances is based at least in part on a virtual model of the vehicle defining a cross-sectional area of the vehicle.

8. The method of claim 7, wherein determining the plurality of horizontal clearance distances includes determining a height profile of the object as a set of horizontal distances between a center line of the virtual model of the vehicle and the two-dimensional contour.

9. The method of claim 7, wherein determining the plurality of horizontal clearance distances includes determining a set of difference values between (1) a set of horizontal distances from a center line of the virtual model of the vehicle to an edge of the virtual model of the vehicle and (2) a set of horizontal distances between a center line of the virtual model of the vehicle and the two-dimensional contour.

10. The method of claim 7, wherein maneuvering the vehicle alongside of the object is further based on the smallest horizontal clearance distance.

11. The method of claim 10, further comprising determining that the smallest horizontal clearance distance meets the threshold minimum horizontal distance before using the smallest horizontal clearance distance to maneuver the vehicle.

12. The method of claim 11, wherein the sensor data includes a three-dimensional bounding box which includes the three-dimensional points and the method further comprises, when the minimum horizontal clearance distance does not meet the threshold minimum horizontal distance, maneuvering the vehicle alongside of the object includes maneuvering the vehicle around the bounding box.

13. The method of claim 1, wherein the sensor data includes a three-dimensional bounding box which includes the three-dimensional points, and wherein maneuvering the vehicle includes maneuvering the vehicle alongside of the object through a location corresponding to a point within a three-dimensional volume of the bounding box.

14. A system for maneuvering a vehicle in an autonomous driving mode alongside of an object, the system comprising one or more computing devices having one or more processors, the one or more computing devices being configured to:
   receive sensor data including three-dimensional points on one or more surfaces of the object in an environment of the vehicle;

determine a two-dimensional contour of the object using the three-dimensional points; and determine a plurality of horizontal clearance distances between the vehicle and the two-dimensional contour of the object; and identify a smallest horizontal clearance distance of the plurality of horizontal clearance distances;

maneuver the vehicle both under at least a portion of the object and alongside at least a portion of the object based on at least a comparison of the smallest horizontal clearance distance and a threshold minimum horizontal distance.

15. The system of claim 14, wherein the two-dimensional contour of the object corresponds to a curvature of the object in a plane perpendicular to a direction of movement of the vehicle.

16. The system of claim 14, wherein the one or more processors are further configured to determine the two-dimensional contour by projecting the three-dimensional points onto a grid.

17. The system of claim 16, wherein the grid corresponds to a plane perpendicular to a direction of movement of the vehicle.

18. The system of claim 16, wherein the one or more processors are further configured to determine the two-dimensional contour by identifying occupied cells of the grid, where an occupied cell corresponds to a cell of the grid in which at least one of the three-dimensional points is projected.

19. The system of claim 18, wherein the one or more processors are further configured to determine the two-dimensional contour includes by using the identified occupied cells to form the two-dimensional contour.

20. The system of claim 14, further comprising the vehicle.

* * * * *